United States Patent [19]

Kawamura

[11] Patent Number: 5,113,269

[45] Date of Patent: May 12, 1992

[54] OPTICAL SCANNER

[75] Inventor: Masunori Kawamura, Hino, Japan

[73] Assignee: Kowa Company Ltd., Japan

[21] Appl. No.: 550,329

[22] Filed: Jul. 9, 1990

[30] Foreign Application Priority Data

Jul. 13, 1989 [JP] Japan .................. 1-179094

[51] Int. Cl.$^5$ ............................. H04N 1/04
[52] U.S. Cl. ........................ 358/474; 358/480; 359/214
[58] Field of Search ............... 358/474, 480, 481, 486, 358/460, 199, 206; 350/6.1, 6.5, 6.6, 6.91; 369/32, 128

[56] References Cited

U.S. PATENT DOCUMENTS

| 4,007,377 | 2/1977 | Simon et al. | 250/566 |
| 4,368,489 | 1/1983 | Stemme et al. | 350/6.6 |
| 4,648,685 | 3/1987 | Fukai et al. | 350/6.6 |

Primary Examiner—Edward L. Coles, Sr.
Assistant Examiner—Thomas D. Lee
Attorney, Agent, or Firm—Bruce L. Adams; Van C. Wilks

[57] ABSTRACT

An optical scanner comprises an optical reflecting means capable of being mechanically displaced to deflect an optical beam for scanning across a target, a driving means for controlling the mechanical displacement of this optical reflecting means, and a storage means for storing digitized data of a driving signal having a predetermined waveform which is set depending on the mechanical characteristics of the optical reflecting means and driving means. The digitized data are sequentially read out and converted into analog signals to drive the reflecting means. This arrangement makes it possible to produce a desired driving waveform which can prevent the overshooting of the reflecting means when it reverses its motion.

9 Claims, 4 Drawing Sheets

OPTICAL SCANNER

BACKGROUND OF THE INVENTION

1. Field of the Invention

This invention relates to an optical scanner, and particularly to an optical scanner which causes an optical signal to scan by means of a moving optical reflecting means.

2. Description of the Prior Art

In the conventional optometric measuring instruments known as laser flare meters and the like, a technique of deflecting a laser beam using an oscillating mirror is known. FIG. 1 shows the structure of such a laser scanning system. Here, only the structure used for one-dimensional scanning is illustrated, but by a combination of these structures, two-dimensional scanning is possible.

In FIG. 1, 13 is a semiconductor laser element or other source of laser light; this laser light impinges on a mirror 11. The mirror 11 is driven by a galvanometer 12 or other driving means to oscillate in the direction of arrow 15. Thereby, the laser light reflected by mirror 11 scans as indicated by arrow 16.

In such a structure, in order for the spot illuminated by the laser beam reflected from the mirror 11 to scan repeatedly over a target 14 at constant velocity, ideally the displacement of the angle of oscillation of the mirror 11 must vary as indicated on FIG. 6. If the inertia of mirror 11 and other conditions are ignored, the waveform of FIG. 6 can be considered to be the ideal driving waveform of the galvanometer 12.

The driving waveform of the galvanometer 12 is conventionally generated by an analog circuit as shown in FIG. 7. The circuit of FIG. 7 is a sawtooth-wave generator circuit which uses an integrator based on an operational amplifier. In FIG. 7, the plus input of operational amplifier 71 is grounded while its minus input receives through a resistor $R$, a voltage which is obtained by a collector supply voltage $V_{CC}$ divided by a variable resistor VR.

A positive feedback circuit comprised of a capacitor C and a switch SW (comprised of a transistor or the like) is provided between the output terminal of the operational amplifier 71 and its minus input. When switch SW is turned on and off at a fixed interval $t_w$ by the output of another oscillator or the like, the operational amplifier 71 produces an output voltage $V_O$ having a waveform as shown in FIG. 8. Note that what is actually shown here is a voltage $-V_O$ which was inverted by an inverting amplifier (not shown) or the like.

In FIG. 8, the 'on' timing of switch SW is indicated by the symbol c and its 'off' timing by the symbol o. During the period in which switch SW is off, the operational amplifier 71 acts to integrate the output voltage across variable resistor VR in accordance with time constants R and C, so that the output voltage $V_O$ increases linearly. On the other hand, when switch SW is turned on, capacitor C is discharged and the output voltage returns linearly to 0 V.

By repeating this integrating action, the driving signal for galvanometer 12 is generated.

However, even if the driving waveform of galvanometer 12 is a sawtooth wave as shown in FIG. 8, the inertia of the galvanometer 12 and mirror 11 will prevent the ideal scanning waveform of mirror 11 as shown in FIG. 6 from being attained, but rather the displacement of mirror 11 will exhibit deviations as shown in FIG. 9. In particular, overshooting appears where the rate of oscillation of the mirror 11 is high, namely in region C of FIG. 9 at the transition from region B (the returning area) to region A. This overshooting becomes more pronounced the greater the mass of the rotating parts of FIG. 1, the higher the velocity of scanning and the greater the rate of change of velocity between regions B and A on FIG. 9.

With such mirror displacement, not only is accurate laser scanning prevented, but there is also a problem of adversely affecting the performance of springs and other parts within the galvanometer 12.

Expensive galvanometers have built-in braking coils which are effective against such overshooting, but inexpensive galvanometers cannot be made to scan accurately without making modifications to the driving waveforms or taking other measures.

For example, by rounding the sharp portions of the driving waveform provided as input to the galvanometer 12 to give a waveform as shown in FIG. 3 and thus lowering the velocity of the mirror 11 when it reverses its motion, overshooting may be reduced. However, with conventional analog circuits, complicated and expensive waveform-shaping circuits are required to generate the signal shown in FIG. 3.

Furthermore, in order to adjust the driving frequency of mirror 11 and the velocity of the mirror 11 when it reverses its motion, the time constants in analog circuits fundamentally must be modified. This makes it impossible to alter only one part of the waveform or to set other extremely exact conditions, thus creating another problem.

The above problems are common to various types of scanning devices which involve optical scanning using mechanical driving means.

SUMMARY OF THE INVENTION

The object of the present invention is to solve the aforementioned problems and provide an optical scanner which may be simply and inexpensively constructed and in which various optical scanning conditions may be readily set.

According to the present invention, there is provided an optical scanner for deflecting an optical beam for scanning across a target comprising a light source for generating the optical beam; optical reflecting means which directs the optical beam towards the target and is mechanically displaceable to deflect the optical beam for scanning thereacross; driving means responsive to a driving signal for driving the optical reflecting means to effect the mechanical displacement thereof; a storage means for storing digitized data having driving waveform which is predetermined depending on the mechanical characteristics of the optical reflecting means and driving means; and control means for reading out the digitized data and converting same into analog signals which are applied as the driving signal to the driving means.

With this arrangement, any digitized data of a driving signal having a desired waveform can be stored depending on the mechanical characteristics of the optical reflecting means and driving means, and read out in analog form, so that optical scanning by the optical reflecting means may be controlled to achieve the desired characteristics.

Preferably, the driving waveform produced by the digitized data is predetermined in such a manner that the driving waveform is rounded at a portion at which the reflecting means reverses its motion in order to prevent the overshooting of the reflecting means. In this manner, alteration of just one portion of the driving signal waveform for the optical reflecting means and changing frequency, which had been impossible with analog signal shaping circuits, becomes possible. Furthermore, by setting the driving waveform, high-precision optical scanning is possible without placing large mechanical loads on the driving means.

According to the preferred embodiment, the control means comprise an address generator for producing an address signal which is sequentially incremented to address the storage means and read the data stored in corresponding addresses in the storage means, and a digital/analog converter for converting the read-out data into the analog signal.

BRIEF DESCRIPTION OF THE DRAWINGS

The objects and features of the present invention will become more apparent from the accompanying drawings and the following detailed description of the invention.

DETAILED DESCRIPTION OF THE PREFERRED EMBODIMENTS

Figure 1:
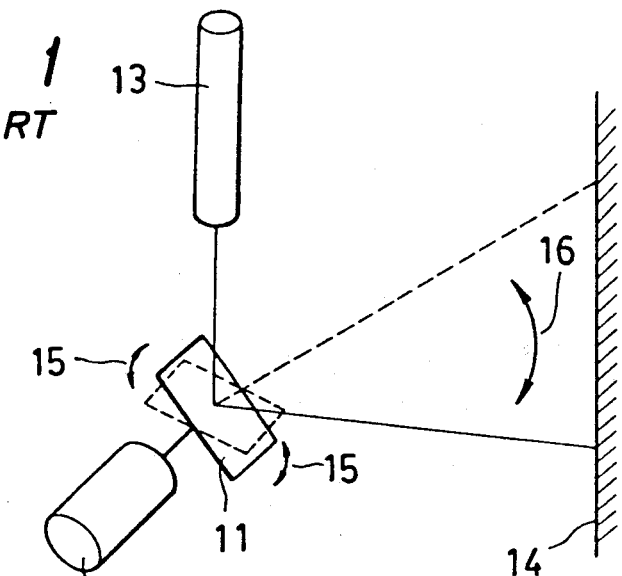
FIG. 1 is an explanatory diagram showing the typical structure of a laser light scanning system.

The present invention will now be described in detail based on preferred embodiments illustrated in the drawings.

The following preferred embodiments represent circuits which form the signal waveform for driving the galvanometer 12 of the laser light driving system as shown in FIG. 1. The device of FIG. 1 is used as an optometric measuring instrument known as a laser flare meter, and in this case, the scanning frequency of the mirror 11 is approximately 50 Hz during alignment of the optical system, and 2 Hz during measurements employing one-dimensional scanning.

Figure 3:
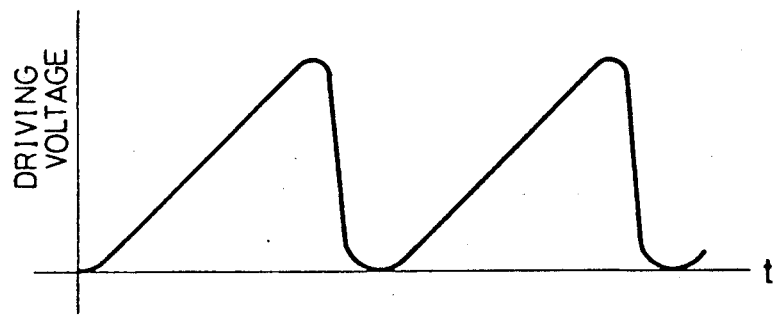
FIG. 3 is a waveform diagram of the ideal driving signal for the laser light scanning system.
Figure 2:
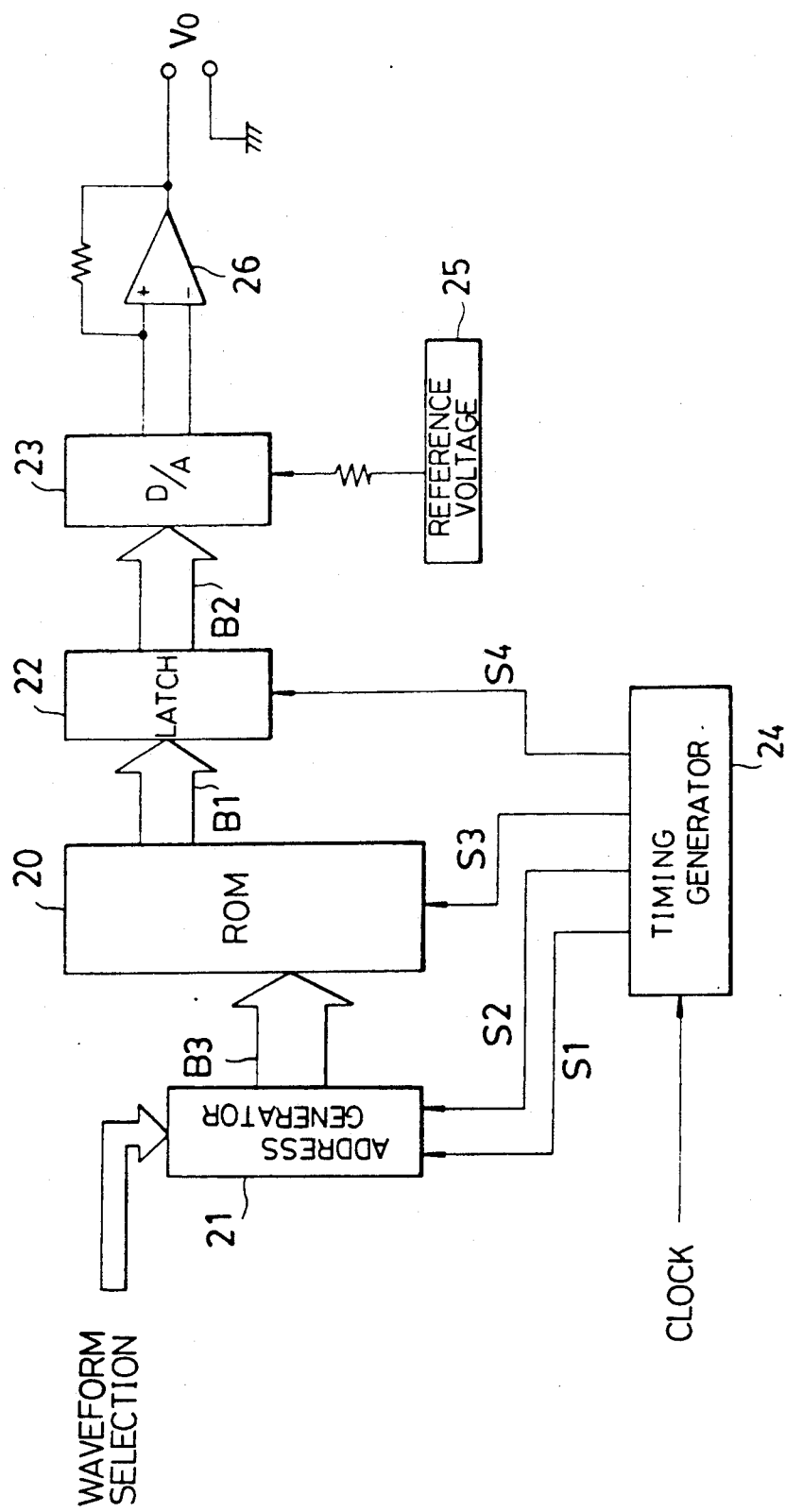
FIG. 2 is a block diagram of the driving signal generator circuit of the present invention.

FIG. 2 shows a circuit according to the present invention for generating the driving signal for the galvanometer 12. In this invention, digital waveform processing is employed to create an ideal driving waveform as shown in FIG. 3 for the galvanometer 12 which can drive the mirror 11 without overshooting.

In FIG. 2, 20 is a ROM which stores the ideal driving waveform for the galvanometer 12 in PCM-encoded format. The waveform of FIG. 4, as in that of FIG. 3, is set taking into consideration the inertia and other mechanical characteristics of the galvanometer 12, particularly by reducing the rate of change of the velocity of the mirror 11 when it reverses its motion.

Figure 4A:
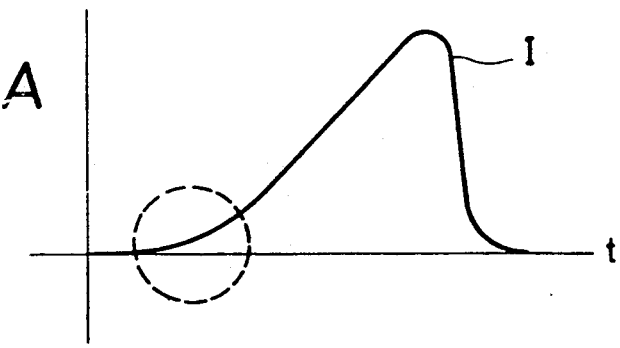
FIGS. 4A and 4B are explanatory diagrams showing the ideal waveforms of the driving signal for the laser light scanning system and its digitization.
Figure 4B:
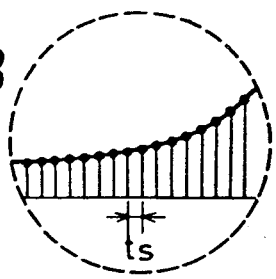

As shown by the enlargement of FIG. 4, the ideal waveform I is sampled at a sampling period $t_s$ and quantized at an appropriate quantization resolution.

For example, in the case of 8-bit quantization, a single sampling datum (8 bits) has an amplitude value of one of 256 levels in the range from 0 to 255. The sampling period $t_s$ is naturally set to a sufficiently short period in comparison to one period of the ideal waveform I. However, one sampling period must be of sufficient length to allow for the signal control to be described hereafter. Note that the following is described using an example in which 8-bit sampling is carried out.

Data for the ideal waveform, sampled and quantized as shown in FIG. 4, is stored in ROM 20 in order starting from the leading edge of the waveform. The data is then read out in order and repeated to recreate an analog waveform which forms an ideal waveform for the driving signal of galvanometer 12 as shown in FIG. 3.

The circuit of FIG. 2 is a circuit used to recreate this waveform.

The waveform data within ROM 20 is addressed using an address generator 21 in order starting from the leading edge of the waveform and provided to a data bus B1 as output. Note that when several sets of waveform data are stored in ROM 20, it is best to allow selection data for the waveform data sets to be preset as the initial address data for the address generator.

The address generator 21 may comprise a common-knowledge address counter or the like which adds an address signal to the address bus B3 of the ROM 20 depending on the clock setting of signal line S2. The address value is reset to an initial value by a clear signal on signal line S1. Read-out control of ROM 20 is accomplished by a read signal on signal line S3.

The waveform data for data bus B1 is provided as output (to data bus B1) of 8-bit parallel data, so it is latched by a latch circuit 22 for digital-to-analog conversion. This latch timing is specified by the clock signal of signal line S4.

The data within the latch circuit 22 is provided as input to a digital-to-analog converter 23 and converted into an analog current signal based on a reference current created from a reference voltage generated by a reference voltage generator 25. The data is converted to a specified analog voltage through an amplifier 26 using an operational amplifier or the like, and then provided as input to the galvanometer 12 of FIG. 1.

The data transfer of the address generator 21 and ROM 20 and the latch operation of the latch circuit 22 are controlled by a timing signal generator 24 via signal lines S1-S4. The timing signal generator 24 may comprise a hard-wired logic circuit or a control circuit employing a microprocessor to generate timing signals on signal lines S1-S4 as shown on FIG. 5.

Figure 5:
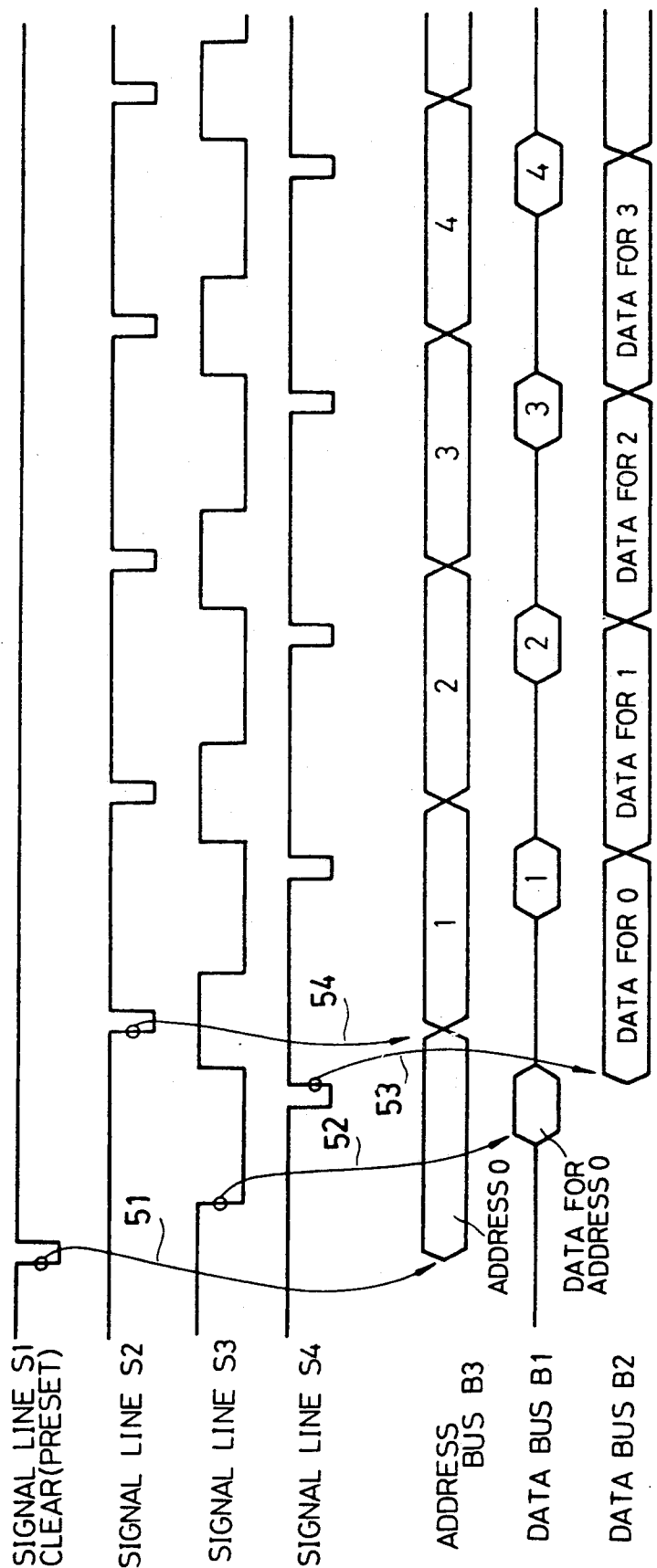
FIG. 5 is a timing chart showing the operation of the circuit of FIG. 2.
Figure 6:
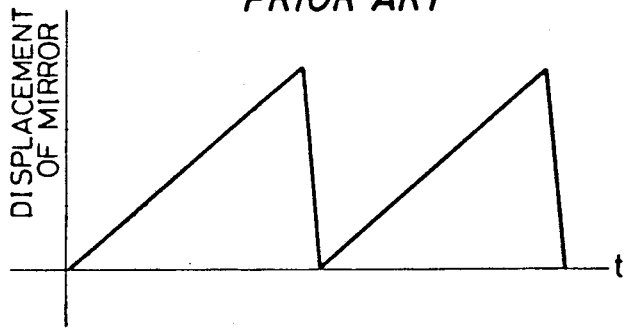
FIG. 6 is a waveform diagram showing the ideal mirror displacement.
Figure 7:
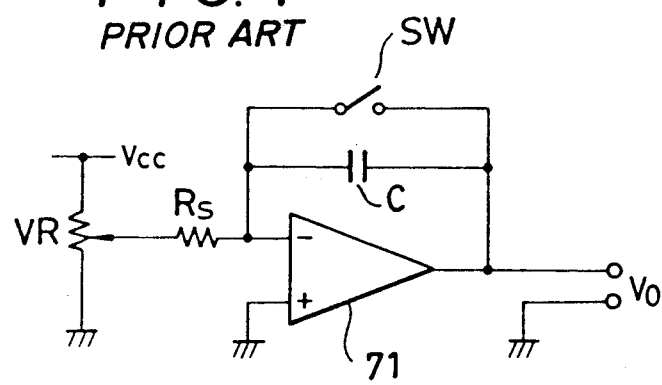
FIG. 7 is a circuit diagram showing a conventional driving signal generator circuit for a laser light scanning system.
Figure 8:
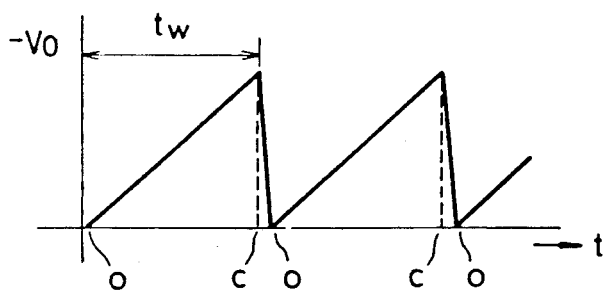
FIG. 8 is a waveform diagram showing the operation of the circuit of FIG. 7.
Figure 9:
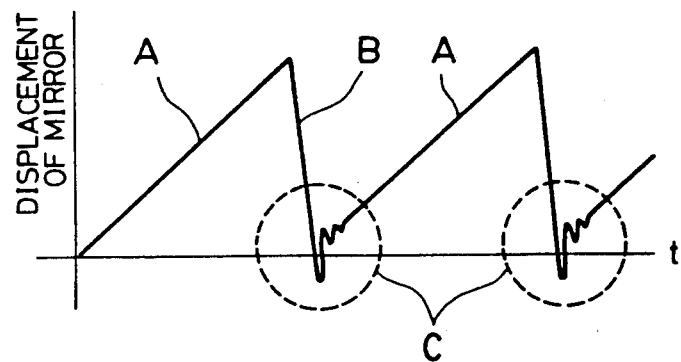
FIG. 9 is a waveform diagram showing the problems of conventional mirror scanning.

Here, control of the timing signal generator 24 will be described in reference to FIG. 5. FIG. 5 illustrates the signal timing for signal lines S1-S4, and the data I/O timing of address bus B3 and data buses B1 and B2 of ROM 20. Here, addresses 0, 1, 2 . . . of ROM 20 store 8-bit quantized waveform sampling data.

In FIG. 5, to initiate output of the driving signal for galvanometer 12, first the timing signal generator 24 generates a 'clear' (or 'preset') pulse on signal line S1. As indicated by the symbol 51, this initializes the address value of address generator 21 to indicate the leading edge of the desired waveform data. The address indicating the first of the 8-bit quantized waveform sampling data within the ROM 20 is provided as output to the address bus B3.

Next. the timing signal generator 24 sends a read pulse to ROM 20 via signal line S3. As indicated by the symbol 52. this causes the ROM 20 to provide as input to data bus B1 the waveform data of the address (address 0 when cleared; this is not the case when the start of a waveform data set is specified using an address preset as indicated above) present on address bus B3.

Next the timing signal generator 24 sends a latch pulse to latch circuit 22 as input via signal line S4. As indicated by the symbol 53. this causes the data on data bus B1 to be latched and the data value (the data value of the start of the waveform data) is held until the next latch pulse is sent. This data value is provided as output to data bus B2.

The digital-to-analog converter 23. based on a reference current created from a reference voltage generated by a reference voltage generator 25. forms an analog current signal corresponding to the data value of data bus B2 and provides the signal as output to amplifier 26. The amplifier 26 converts this signal into a specified voltage which is then provided as input to the galvanometer 12.

On the other hand. once the latch of latch circuit 22 is complete. the timing signal generator 24 generates a pulse in signal line S2 which increments the address value of address generator 21. Here. since 8-bit data is being handled. the address value of address generator 21 is incremented by +1 (for 16-bit sampling or other instances when a different quantization resolution is used. the incremented value corresponds to the resolution).

By repeating the aforementioned one cycle of read control. the driving waveform for galvanometer 12 stored in PCM-encoded format in the ROM 20 may be recreated. Note that one merely needs to record sampling data corresponding to a specified number of cycles (at least one cycle, or several cycles) of one type of waveform in ROM 20, and after one set of waveform data is recreated. again preset the address of ROM 20 to the address of the leading edge of the waveform data (the address value may also be reset by an overflow of address generator 21) and repeat the control of FIG. 5.

By means of the above structure. theoretically any driving waveform of galvanometer 12 may be generated at any frequency.

Modification of the driving waveform is possible by storing a plurality of waveform data sets in the ROM 20 and changing their read addresses. In this case, if the ROM 20 has sufficient capacity, one or more higher-order bits of the address lines may be reserved for waveform selection. In addition, the driving waveform may be modified by replacing the ROM 20. Furthermore, RAM or other memory means may be used instead of ROM so that waveform data may be loaded from an external memory device. In this case, editing of the waveform data is possible.

In addition, when using this scheme of digitally recording the waveform data, the clock frequency of signal lines S1-S4 of FIG. 2 and FIG. 5 may be changed to allow the driving frequency for galvanometer 12, and consequently the scanning frequency of the laser light, to be readily changed. In conventional signal generation using analog circuits, frequency adjustments are carried out by adjusting the fundamental time constants, so it is difficult to change the frequency. In addition, in conventional analog circuits. the length of the return-line area is determined by the capacitance of the capacitor C but with the structure above. there is no limit to the length of the outward scanning path. but rather it may be set arbitrarily.

In a laser scanning system as shown in FIG. 1. by providing an ideal driving waveform. with a reduced rate of change of the velocity of the mirror 11 when it reverses its motion. as input to the galvanometer 12 which drives the mirror 11. the galvanometer 12 may be driven without overshooting.

In addition since there is no need to use an expensive galvanometer with braking coils or the like as the galvanometer 12. not only are cost reductions possible, but the mechanical load applied to the galvanometer 12 may also be reduced as another superior effect of the invention.

Note that the circuit of FIG. 2 may comprise a DSP (digital signal processor) or the like.

The aforementioned was an example of an optical system using a galvanometer 12 to drive a mirror 11 used for scanning of laser light. but the same technique may also be similarly employed even if the scanning light is not laser light. or the reflecting means is not a flat mirror. or if the means of driving the reflecting means is not a galvanometer 12.

While the invention has been described with reference to a preferred embodiment, it will be understood by those skilled in the art that various changes may be made and equivalents may be substituted for elements thereof without departing from the scope of the invention. In addition. many modifications may be made to adapt a particular situation or material to the teachings of the invention without departing from the essential scope thereof. Therefore. it is intended that the invention should not be limited to the particular embodiment disclosed as the best mode contemplated for carrying out the invention. but that the invention will include all embodiments falling within the scope of the appended claims.

What is claimed is:

1. An optical scanner for deflecting an optical beam for scanning across a target comprising:
   a light source for generating the optical beam;
   optical reflecting means for reflecting the optical beam towards the target and being mechanically displaceable to reflect the optical beam for scanning thereacross;
   driving means responsive to a driving signal for driving the optical reflecting means to effect the mechanical displacement thereof;
   storage means for storing predetermined PCM-encoded data having a driving waveform in addresses is said storage means, said PCM-encoded data dependent on mechanical characteristics of the optical reflecting means and driving means; and
   control means comprising reading means for successively reading out the PCM-encoded data from the addresses, the read-out PCM-encoded data forming a digitized signal for driving the optical reflecting means and means for converting the digitized signal into analog signals and applying the analog signals as the driving signal to the driving means.

2. An optical scanner according to claim 1, wherein said reading means further comprises an address generator for producing an address signal which is sequentially incremented to address the storage means and read the PCM-encoded data stored in the corresponding addresses.

3. An optical scanner according to claim 1, wherein said PCM-encoded data is predetermined in such a manner that the driving waveform is rounded at a portion at which the reflecting means reverses its motion.

4. An optical scanner according to claim 3, wherein the PCM-encoded data are stored in the storage means for at least one cycle of the driving waveform.

5. An optical scanner for deflecting an optical beam for scanning across a target comprising:
a light source for generating an optical beam;
optical reflecting means operative when driven for reflecting the optical beam towards a target;
driving means responsive to a driving signal for driving the optical reflecting means;
storing means for storing PCM-encoded data in predetermined addresses dependent on mechanical characteristics of the optical scanner; and
controlling means for generating the driving signal for controlling the optical reflecting means dependent on the PCM-encoded data.

6. An optical scanner according to claim 5, wherein the controlling means comprises means for successively reading out the PCM-encoded data from addresses as a digitized signal.

7. An optical scanner according to claim 6, wherein the controlling means further comprises means for converting the digitized signal into an analog driving signal for driving the optical reflecting means.

8. An optical scanner according to claim 5, wherein the PCM-encoded data is predetermined such that a driving waveform of the driving signal is rounded at a portion corresponding to that at which the reflecting means reverses its motion.

9. An optical scanner according to claim 5, wherein the storing means includes means for storing the PCM-encoded data for at least one cycle of the driving waveform.

* * * * *